United States Patent
Iida et al.

(10) Patent No.: US 11,539,055 B2
(45) Date of Patent: Dec. 27, 2022

(54) AIR-METAL SECONDARY BATTERY

(71) Applicant: Murata Manufacturing Co., Ltd., Kyoto (JP)

(72) Inventors: Hironori Iida, Kanagawa (JP); Seiichiro Tabata, Kanagawa (JP); Shun Yamanoi, Kanagawa (JP); Shinichiro Yamada, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 913 days.

(21) Appl. No.: 14/775,111

(22) PCT Filed: Mar. 7, 2014

(86) PCT No.: PCT/JP2014/056044
§ 371 (c)(1),
(2) Date: Sep. 11, 2015

(87) PCT Pub. No.: WO2014/148283
PCT Pub. Date: Sep. 25, 2014

(65) Prior Publication Data
US 2016/0049665 A1    Feb. 18, 2016

(30) Foreign Application Priority Data

Mar. 18, 2013  (JP) .............................. JP2013-055253

(51) Int. Cl.
H01M 4/96 (2006.01)
H01M 12/08 (2006.01)
(Continued)

(52) U.S. Cl.
CPC ............... H01M 4/96 (2013.01); H01M 4/90 (2013.01); H01M 12/08 (2013.01); *H01M 4/382* (2013.01); *Y02E 60/10* (2013.01)

(58) Field of Classification Search
CPC ...... H01M 4/96; H01M 4/9083; H01M 4/133; H01M 4/1939; H01M 4/583; H01M 4/90; H01M 4/382; C01B 32/05; Y02E 60/128
See application file for complete search history.

(56) References Cited

U.S. PATENT DOCUMENTS

2012/0143133 A1   6/2012   Congnome Cane'
2013/0316253 A1*  11/2013  Barde ................ H01M 4/8825
                                                    429/405

FOREIGN PATENT DOCUMENTS

JP    2002-015737    1/2002
JP    2011-175929    9/2011
(Continued)

OTHER PUBLICATIONS

International Search Report issued in connection with International Patent Application No. PCT/JP2014/056044, dated Apr. 8, 2014. (2 pages).

*Primary Examiner* — Jimmy Vo
(74) *Attorney, Agent, or Firm* — K&L Gates LLP

(57) ABSTRACT

An air-metal secondary battery has an electrode including a porous carbon material, wherein the porous carbon material has a specific surface area of 280 $m^2/g$ or more, preferably 700 $m^2/g$ or more, more preferably 1,500 $m^2/g$ or more, as determined by a nitrogen BET method, and the air-metal secondary battery has an average charging voltage of 4.4 V or less, preferably 4.3 V or less, more preferably 4.1 V or less.

12 Claims, 7 Drawing Sheets

(51) Int. Cl.
*H01M 4/90* (2006.01)
*H01M 4/38* (2006.01)

(56) References Cited

FOREIGN PATENT DOCUMENTS

| | | |
|---|---|---|
| JP | 4945884 | 6/2012 |
| JP | 2012-243576 | 12/2012 |
| JP | 2014-022210 | 2/2014 |
| WO | 2011/148518 | 12/2011 |
| WO | WO-2012111169 A1 * | 8/2012 .......... H01M 4/8825 |

* cited by examiner

AIR-METAL SECONDARY BATTERY

CROSS REFERENCES TO RELATED APPLICATIONS

The present application is a national stage of International Application No. PCT/JP2014/056044 filed on Mar. 7, 2014 and claims priority to Japanese Patent Application No. 2013-055253 filed on Mar. 18, 2013, the disclosure of which is incorporated herein by reference.

BACKGROUND

The present disclosure relates to an air-metal secondary battery.

An air-metal secondary battery, in which a high energy density metal and oxygen in the air are used as anode and cathode active materials, respectively, can theoretically provide a high energy density. For example, JP 2002-015737 A discloses a nonaqueous electrolyte battery including: a cathode composed mainly of a carbonaceous material in which pores with diameters of at least 1 nm occupy a volume of 1.0 ml/g or more; an anode including an anode active material capable of occluding and releasing metal ions; and a nonaqueous electrolyte layer between the cathode and the anode.

CITATION LIST

Patent Document

Patent Document 1: JP 2002-015737 A

SUMMARY

Problems to be Solved by the Invention

Now, there are various problems with the commercialization of air-metal secondary batteries, such as air-lithium secondary batteries. One of the problems is to reduce the average charging voltage. Specifically, an air-metal secondary battery has a high overvoltage, which is the difference between the theoretical potential of the thermodynamically favorable reaction and the potential of the electrode achieved when the actual reaction proceeds. In other words, an air-metal secondary battery has a high average charging voltage. This is a big factor that inhibits the improvement of the energy efficiency.

It is therefore an object of the present disclosure to provide an air-metal secondary battery that can have a lower average charging voltage.

Solutions to Problems

To achieve the object, the air-metal secondary battery of the present disclosure has an electrode including a porous carbon material, wherein the porous carbon material has a specific surface area of 280 m²/g or more, preferably 700 m²/g or more, more preferably 1,500 m²/g or more, as determined by a nitrogen BET method, and the air-metal secondary battery of the present disclosure has an average charging voltage of 4.4 V or less, preferably 4.3 V or less, more preferably 4.1 V or less. The "average charging voltage" may be defined as the value obtained by integrating the voltage of a charging curve from a charging capacity of 0% to a charging capacity of 100% and averaging the integrated value.

Effects of the Invention

The air-metal secondary battery of the present disclosure has an electrode including a porous carbon material having a specified specific surface area as determined by a nitrogen BET method. The air-metal secondary battery of the present disclosure also has a specified average charging voltage. These features make it possible to provide an air-metal secondary battery with a lower average charging voltage.

Additional features and advantages are described herein, and will be apparent from the following Detailed Description and the figures.

DETAILED DESCRIPTION

Figure 1:
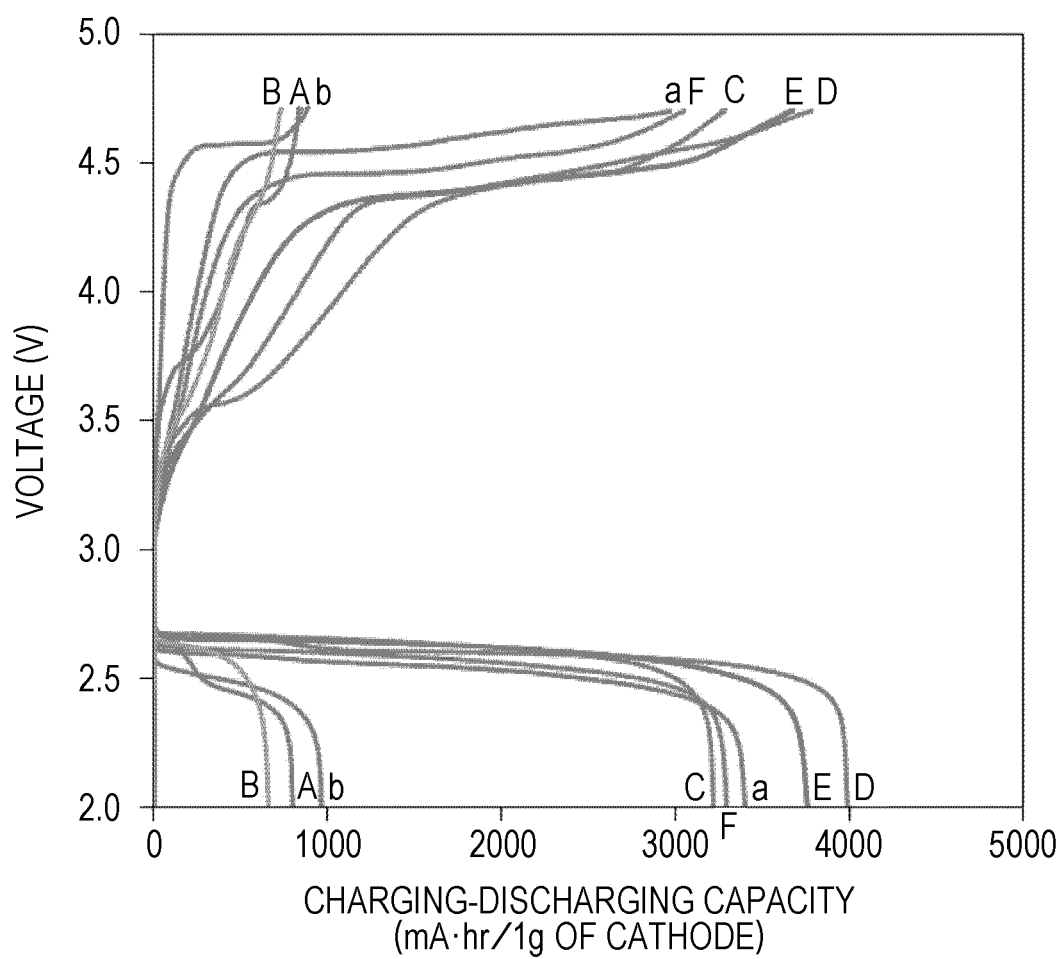
FIG. 1 is a graph showing the results of measurement of the charging-discharging capacity of air-metal secondary batteries according to Example 1.

Hereinafter, the present disclosure will be described based on examples with reference to the drawings. It will be understood that the examples are not intended to limit the present disclosure and various values and materials in the examples are by way of example only. Descriptions will be provided in the following order.

1. Description of all aspects of air-metal secondary battery of the present disclosure
2. Example 1 (air-metal secondary battery)
3. Example 2 (modification of Example 1) and others

[Description of all Aspects of Air-Metal Secondary Battery of the Present Disclosure]

The air-metal secondary battery of the present disclosure preferably has an average charging voltage $V_{ch\text{-}ave}$ in the range of $a \cdot S_{BET} + b$ to $c \cdot S_{BET} + d$ ($a \cdot S_{BET} + b \leq V_{ch\text{-}ave} \leq c \cdot S_{BET} + d$), wherein $S_{BET}$ is the specific surface area of the porous carbon material as determined by a nitrogen BET method, $a = -2 \times 10^{-4}$ (V·g·m²), $c = -2 \times 10^{-4}$ (V·g·m²), $b = 4.0$ (V), and $d = 5.0$ (V).

In the air-metal secondary battery of the present disclosure including the above preferred mode, the porous carbon material may be derived from a plant and have a pore volume of 0.1 cm$^3$/g or more as determined by a BJH method and an MP method. The porous carbon material may also be made from a plant-derived material with a silicon content of 5% by mass or more. For the sake of convenience, such a porous carbon material will be referred to as a "plant-derived porous carbon material."

Alternatively, in the air-metal secondary battery of the present disclosure including the above preferred mode, the porous carbon material may include an inverse opal-type porous carbon material or a porous carbon material produced by a template method. In this case, for example, the inverse opal-type porous carbon material or the porous carbon material produced by a template method may have three-dimensional regularity, and, specifically, may have pores arranged three-dimensionally regularly and arranged in a pattern forming a crystal structure macroscopically and have a pore distribution with a maximum in the range of 2 nm to 300 nm. Hereinafter, for the sake of convenience, such an inverse opal-type porous carbon material or such a porous carbon material produced by a template method will be referred to as a "porous carbon material of an inverse opal type or the like." The pores may be arranged in any pattern corresponding to a crystal structure macroscopically. Such a crystal structure may be, for example, a single crystal structure. Specifically, such a crystal structure may be a face-centered cubic structure, a body-centered cubic structure, a simple cubic structure, or the like. In particular, a face-centered cubic structure, in other words, a close-packed structure is preferred in order to increase the surface area of the porous carbon material. The arrangement of pores in a pattern corresponding to a crystal structure means that the pores are arranged in a pattern like that of atoms in a crystal. In such a mode, the pores are preferably arranged in a face-centered cubic structure macroscopically, and, more preferably, the pores are macroscopically arranged in a pattern corresponding to a (111)-oriented face-centered cubic structure (specifically, the pores are arranged in a pattern like that of atoms in the (111) plane of a face-centered cubic structure). The pores are also preferably arranged continuously. In other words, at least some of the pores preferably communicate with one another. The pores may have any shape. As described below, for example, the shape of the pores is determined to a certain extent by the shape of a template particle assembly (an assembly of inorganic particles, inorganic material particles, or inorganic compound particles, used as a template and also called a colloidal crystal) used in the production of the porous carbon material. Preferably, the shape of the pores is spherical or substantially spherical in view of the mechanical strength of the porous carbon material and the ability to control the shape of the template particle assembly on the nano-scale. In addition, the starting material for the porous carbon material is preferably such that a non-graphitizable carbon material or a graphitizable carbon material can be obtained from it.

As used herein, the term "macroscopically" means that an arrangement pattern corresponding to a crystal structure is observed in a region larger than a micro region (such as a region with a size of 10 μm×10 μm). The term "macroscopically" also implies cases where the reflection spectrum of the surface of the porous carbon material shows absorption at substantially a single wavelength and the whole of the porous carbon material has a single color. Specifically, for example, the wavelength of light reflected from the porous carbon material may be measured when white light is applied at a grazing incidence angle of 0° to the porous carbon material in a dark place. In this case, if the resulting reflection spectrum shows single-peak absorption at a specific wavelength corresponding to the pore size, the pores inside the material can be considered to be almost regularly arranged at certain intervals. More specifically, for example, single-peak absorption at a wavelength of 450 nm shows that pores with a diameter of about 280 nm are arranged almost regularly.

Alternatively, the porous carbon material preferably has a three-dimensional network structure. In this case, the pores are preferably formed continuously. In other words, at least some of the pores preferably communicate with one another.

The air-metal secondary battery of the present disclosure including the above preferred mode and features may include an electrode configured to form a cathode and may be designed to be an air-lithium secondary battery. Specifically, lithium (Li) may be contained as an anode active material in an anode.

Hereinafter, the plant-derived porous carbon material and the porous carbon material of an inverse opal type or the like will be described.

As mentioned above, the plant-derived porous carbon material preferably has a pore volume of 0.1 cm$^3$/g or more as determined by a BJH method or a pore volume of 0.1 cm$^3$/g or more as determined by an MP method. In this case, the content of silicon (Si) in the plant-derived porous carbon material is typically, but not limited to, less than 5% by mass, preferably 3% by mass or less, more preferably 1% by mass or less. As mentioned above, the content of silicon (Si) in the raw material (the plant-derived material before carbonization) is preferably 5% by mass or more.

Various elements can be analyzed by, for example, energy dispersive spectroscopy (EDS) using an energy dispersive X-ray analyzer (such as JED-2200F manufactured by JEOL Ltd.). In this method, the measurement conditions may include, for example, a scanning voltage of 15 kV and an irradiation current of 10 μA.

The plant-derived porous carbon material can be obtained by, for example, a process that includes carbonizing a plant-derived material at a temperature of 400° C. to 1,400° C., then treating the product with an acid or an alkali, and then heat-treating the product at a temperature above the carbonization temperature. The heat treatment at a temperature above the carbonization temperature allows the plant-derived porous carbon material to undergo a kind of densification, which makes it possible to provide a plant-derived porous carbon material having voids (size and volume) more suitable for electrode materials. The heat treatment at a temperature above the carbonization temperature is preferably preceded by grinding into an average particle size of less than 4 μm, preferably 0.5 μm or less. The grinding method may be a grinding method using a bead mill, a method using a ball mill or a jet mill, or the like. In addition, an acid or alkali treatment is preferably performed to remove silicon components from the plant-derived material after the carbonization. The acid or alkali treatment may be followed or preceded by an activation treatment.

As used herein, the term "carbonizing or carbonization" generally means that an organic material is converted into a carbonaceous material by a heat treatment (see, for example, JIS M 0104 (1984)). The atmosphere for the carbonization may be an oxygen-deficient atmosphere, examples of which include a vacuum atmosphere, an inert gas atmosphere such as a nitrogen or argon gas atmosphere, and an atmosphere in which an organic material can undergo a kind of steaming and roasting process.

The material obtained by carbonizing a plant-derived material at a temperature of 400° C. to 1,400° C. before the acid or alkali treatment will be referred to as the "porous carbon material precursor" or the "carbonaceous material." The material obtained by carbonizing a plant-derived material at a temperature of 400° C. to 1,400° C. and then subjecting the product to the acid or alkali treatment (before the grinding) will be referred to as the "porous carbon material intermediate" for the sake of convenience. Hereinafter, such a method for producing the porous carbon material intermediate may be referred to as "the porous carbon material intermediate production method." The porous carbon material intermediate is preferably further subjected to the grinding process and then subjected to the heat treatment at a temperature above the carbonization temperature, so that an electrode material or a plant-derived porous carbon material is successfully obtained.

Although depending on the plant-derived material used, the plant-derived material may be subjected, before the carbonization, to a heat treatment at a temperature (e.g., 400° C. to 700° C.) lower than the carbonization temperature under the condition where oxygen is blocked. Hereinafter, such a heat treatment will be referred to as a "pre-carbonization treatment." This treatment allows the extraction of a tar component, which would otherwise be produced in the carbonization process. Therefore, this treatment can reduce or eliminate the tar component, which would otherwise be produced in the carbonization process. The condition where oxygen is blocked can be achieved by providing an inert gas atmosphere such as a nitrogen or argon gas atmosphere, providing a vacuum atmosphere, or subjecting the plant-derived material to a kind of steaming and roasting process. Although depending on the plant-derived material used, the plant-derived material may be immersed in an alcohol (such as methyl alcohol, ethyl alcohol, or isopropyl alcohol) so that mineral components and water in the plant-derived material can be reduced or the carbonization process can be prevented from generating foul smell. Subsequently, a pre-carbonization treatment may also be performed. Materials on which a pre-carbonization treatment in an inert gas is preferably performed include plants from which a large amount of wood vinegar (tar and light oil) can be produced. Materials on which the pretreatment with an alcohol is preferably performed include marine plants rich in iodine and various minerals.

The porous carbon material intermediate production method includes carbonizing the plant-derived material at a temperature of 400° C. to 1,400° C. The atmosphere for the carbonization may be an oxygen-deficient atmosphere, examples of which include a vacuum atmosphere, an inert gas atmosphere such as a nitrogen or argon gas atmosphere, and an atmosphere in which the plant-derived material can undergo a kind of steaming and roasting process. The rate of temperature rise to the carbonization temperature is typically, but not limited to, 1° C./minute or more, preferably 3° C./minute or more, more preferably 5° C./minute or more in the corresponding atmosphere. The upper limit of the carbonization time is typically, but not limited to, 10 hours, preferably 7 hours, more preferably 5 hours. The lower limit of the carbonization time may be such that the plant-derived material can be reliably carbonized. If necessary, the plant-derived material may also be ground into particles with a desired size or subjected to classification. The plant-derived material may also be washed in advance. Alternatively, if necessary, the resulting porous carbon material precursor or intermediate or the plant-derived porous carbon material may be ground into particles with a desired size or subjected to classification. Alternatively, after the activation treatment, if necessary, the porous carbon material intermediate or the plant-derived porous carbon material may be ground into particles with a desired size or subjected to classification. The furnace for use in the carbonization may be of any type, configuration, or structure and may be a continuous furnace or a batch furnace.

The atmosphere for the heat treatment may be an oxygen-deficient atmosphere, examples of which include a vacuum atmosphere, an inert gas atmosphere such as a nitrogen or argon gas atmosphere, and an atmosphere in which the porous carbon material intermediate can undergo a kind of steaming and roasting process. The rate of temperature rise to the heat treatment temperature is typically, but not limited to, 1° C./minute or more, preferably 3° C./minute or more, more preferably 5° C./minute or more in the corresponding atmosphere. The difference between the carbonization temperature and the heat treatment temperature may be appropriately determined by performing different tests. The upper limit of the heat treatment time is typically, but not limited to, 10 hours, preferably 7 hours, more preferably 5 hours. The lower limit of the heat treatment time may be such that the desired properties can be imparted to the plant-derived porous carbon material. The furnace for use in the heat treatment may be of any type, configuration, or structure and may be a continuous furnace or a batch furnace.

The activation treatment can be performed to increase micro pores (described below) with a pore size smaller than 2 nm. The activation treatment method may be a gas activation method or a chemical activation method. In this case, the gas activation method includes using oxygen, water vapor, carbon dioxide gas, air, or the like as an activator and heating the porous carbon material intermediate at a temperature of 700° C. to 1,400° C., preferably 700° C. to 1,000° C., more preferably 800° C. to 1,000° C. for tens of minutes to several hours in the corresponding gas atmosphere so that volatile components and carbon molecules in the porous carbon material intermediate can form finer structures. More specifically, the heating temperature in the activation treatment may be appropriately selected depending on the type of the plant-derived material or the type, concentration, or other properties of the gas. The chemical activation method includes activating the material with zinc chloride, iron chloride, calcium phosphate, calcium hydroxide, magnesium carbonate, potassium carbonate, sulfuric acid, or the like instead of oxygen or water vapor used in the gas activation method; washing the activated material with hydrochloric acid; adjusting the pH of the activated material with an aqueous alkaline solution; and drying the activated material.

The acid or alkali treatment is used to remove silicon components from the plant-derived material after the carbonization. The silicon components include silicon oxides such as silicon dioxide, silicon oxide, and silicon oxide salts. Such removal of silicon components from the plant-derived material after the carbonization makes it possible to obtain a plant-derived porous carbon material having a high specific surface area. In some cases, a dry etching method may be used to remove silicon components from the plant-derived material after the carbonization. Specifically, a preferred mode of the plant-derived porous carbon material is as follows. A plant-derived material containing silicon (Si) is used as a raw material. When converted into a porous carbon material precursor or a carbonaceous material, the plant-derived material is carbonized at a high temperature (e.g., 400° C. to 1,400° C.). In this process, silicon contained in the plant-derived material is converted not to silicon carbide (SiC) but to silicon components (silicon oxides) such as silicon dioxide ($SiO_x$), silicon oxide, and silicon oxide salts. Silicon components (silicon oxides) contained in the plant-derived material before the carbonization do not substantially change even when subjected to the carbonization at a high temperature (e.g., 400° C. to 1,400° C.). Therefore, the silicon components (silicon oxides) such as silicon dioxide, silicon oxide, and silicon oxide salts are removed by the acid or alkali (base) treatment in the next step, so that the resulting product has a large specific surface area as determined by nitrogen BET method. In addition, the plant-derived porous carbon material is a natural product-derived, environmentally-compatible material having a fine structure formed by removing silicon components (silicon oxides), which are previously present in the plant-derived raw material, by the acid or alkali treatment. Therefore, the arrangement of the pores maintains the biological regularity of the plant.

As mentioned above, the plant-derived porous carbon material is made from a plant-derived material. Examples of the plant-derived material include, but are not limited to, chaff and straws of rice (paddy), barley, wheat, rye, Japanese millet, foxtail millet, and the like, coffee beans, tea leaves (e.g., leaves of green tea, black tea, and the like), sugar canes (more specifically, bagasse), corns (more specifically, core of corns), fruit peels (e.g., citrus peels such as orange peel, grapefruit peel, and mandarin orange peel, banana peel, and the like), reeds, Wakame seaweed (Undaria pinnatifida) stems, and others such as terrestrial vascular plants, ferns, bryophytes, algae, and marine algae. As a raw material, these materials may be used alone or in a mixture of two or more. The plant-derived material may be of any shape or form. For example, the plant-derived material may be chaff or straw itself or a dried product. Materials having undergone various processes such as fermentation, roasting, and extraction in beverage or food processing for beers, western liquors, or the like may also be used. In particular, straws or chaff after thrashing and other processes is preferably used in view of the reuse of industrial wastes. Chaff or straws after the processing are easily available in a large amount from, for example, agricultural cooperatives, liquor companies, food companies, or food processing companies.

The plant-derived porous carbon material has a large number of pores. Pores include mesopores with a pore size of 2 nm to 50 nm, micropores with a pore size of less than 2 nm, and macropores with a pore size of more than 50 nm. The plant-derived porous carbon material should have a pore volume of 0.1 cm$^3$/g or more, preferably 0.2 cm$^3$/g or more, more preferably 0.3 cm$^3$/g or more, even more preferably 0.5 cm$^3$/g or more, as determined by a BJH method. As determined by an MP method, the pore volume of the plant-derived porous carbon material should also be 0.1 cm$^3$/g or more, preferably 0.2 cm$^3$/g or more, more preferably 0.3 cm$^3$/g or more, even more preferably 0.5 cm$^3$/g or more. The micropores include, for example, a large number of pores with a pore size of about 1.9 nm, pores with a pore size of about 1.5 nm, and pores with a pore size of about 0.8 nm to about 1 nm.

The nitrogen BET method is a method that includes adsorbing and desorbing nitrogen as an admolecule on the adsorbent (the porous carbon material in this case) to measure an adsorption isotherm and then analyzing the measured data based on the BET formula represented by formula (1). The specific surface area, the pore volume, and the like can be calculated based on this method. Specifically, the specific surface area can be calculated by the nitrogen BET method as follows. First, an adsorption isotherm is determined by adsorbing and desorbing nitrogen as an admolecule to and from the porous carbon material. The resulting adsorption isotherm is used to calculate $[p/\{V_a(p_0-p)\}]$ based on formula (1) or formula (1') as a modification of formula (1), which is then plotted versus the equilibrium relative pressure ($p/p_0$). Assuming that the plot is a straight line, the slope s ($=[(C-1)/(C \cdot V_m)]$) and the intercept i ($=[1/(C \cdot V_m)]$) are calculated based on the least squares method. The calculated slope s and intercept i are used to calculate $V_m$ and C based on formulae (2-1) and (2-2). $V_m$ is then used to calculate the specific surface area $a_{sBET}$ based on formula (3) (see BELSORP-mini and BELSORP analysis software manual, pp. 62-66, made by BEL Japan Inc.). The nitrogen BET method is a measurement method according to JIS R 1626 (1996) "Method for Measuring Specific Surface Area of Fine Ceramic Powder by Gas Adsorption BET method."

$$V_a=(V_m \cdot C \cdot p)/[(p_0-p)\{1+(C-1)(p/p_0)\}] \tag{1}$$

$$[p/\{V_a(p_0-p)\}]=[(C-1)/(C \cdot V_m)](p/p_0)+[1/(C \cdot V_m)] \tag{1'}$$

$$V_m=1/(s+i) \tag{2-1}$$

$$C=(s/i)+1 \tag{2-2}$$

$$a_{sBET}=(V_m \cdot L \cdot \sigma)/22414 \tag{3}$$

In the formulae, $V_a$ is adsorbed amount, $V_m$ monolayer adsorbed amount, p nitrogen pressure in equilibrium, $p_0$ saturated vapor pressure of nitrogen, L Avogadro's number, and σ sectional area for nitrogen adsorption.

The pore volume $V_p$ can be calculated by the nitrogen BET method as follows. For example, the adsorption data of the determined adsorption isotherm are linearly interpolated to determine the adsorbed amount V at the relative pressure set for the calculation of the pore volume. The pore volume $V_p$ can be calculated from the adsorbed amount V based on formula (4) (see BELSORP-mini and BELSORP analysis software manual, pp. 62-65, made by BEL Japan Inc.). The pore volume determined by the nitrogen BET method may be referred to simply as "the pore volume."

$$V_p=(V/22414) \times (M_g/\rho_g) \tag{4}$$

In the formula, V is the adsorbed amount at the relative pressure, $M_g$ the molecular weight of nitrogen, and $\rho_g$ the density of nitrogen.

For example, the mesopore size can be calculated by obtaining a pore distribution from the rate of pore volume change with respect to the pore size based on the BJH method. The BJH method is widely used as a method for pore distribution analysis. Pore distribution analysis can be performed based on the BJH method as follows. First, a desorption isotherm is determined by adsorbing and desorbing nitrogen as an admolecule to and from the porous carbon material. The resulting desorption isotherm is then used to determine the thickness of the adsorption layer formed when the adsorbed molecules (e.g., nitrogen), with which the pores have been filled, are gradually released from the pores and to determine the inner diameter (twice the core radius) of the pores formed in this process. The pore radius $r_p$ and the pore volume are then calculated based on formulae (5) and (6), respectively. Subsequently, a pore distribution curve is obtained by plotting the rate ($dV_p/dr_p$) of pore volume change, based on the pore radius and the pore volume, versus the pore diameter ($2r_p$) (see BELSORP-mini and BELSORP analysis software manual, pp. 85-88, made by BEL Japan Inc.).

$$r_p = t + r_k \tag{5}$$

$$V_{pn} = R_n \cdot dV_n - R_n \cdot dt_n \cdot c \cdot \Sigma A_{pj} \tag{6}$$

In the formula, $R_n = r_{pn}^2 / (r_{kn-1} + dt_n)^2$ (7)

In the formulae, $r_p$ is the pore radius, $r_k$ the core radius (inner diameter/2) when an adsorption layer with a thickness of t is formed on the inner wall of pores with a pore radius of $r_p$ at the corresponding pressure, $V_{pn}$ the pore volume at the time of n-th adsorption/desorption of nitrogen, $dV_n$ the amount of change at the time of n-th adsorption/desorption of nitrogen, $dt_n$ the amount of change in the thickness $t_n$ of the adsorption layer at the time of n-th adsorption/desorption of nitrogen, $r_{kn}$ the core radius at the time of n-th adsorption/desorption of nitrogen, c a fixed value, and $r_{pn}$ the pore radius at the time of n-th adsorption/desorption of nitrogen. $\Sigma A_{pj}$ represents the value obtained by integrating the pore wall surface area from j=1 to j=n−1.

For example, the micropore size can be calculated by obtaining a pore distribution from the rate of pore volume change with respect to the pore size based on the MP method. Pore distribution analysis can be performed by the MP method as follows. First, an adsorption isotherm is determined by adsorbing nitrogen to the porous carbon material. The adsorption isotherm is then converted to a plot (t-plot) of the pore volume versus the thickness t of the adsorption layer. Subsequently, a pore distribution curve can be obtained based on the curvature of the plot (the amount of change in the pore volume relative to the amount of change in the thickness t of the adsorption layer) (see BELSORP-mini and BELSORP analysis software manual, pp. 72-73, 82, made by BEL Japan Inc.).

The porous carbon material precursor is treated with an acid or an alkali. Specifically, the treatment method may be, for example, a method of immersing the porous carbon material precursor in an aqueous acid or alkali solution or a method of allowing the porous carbon material precursor to react with an acid or an alkali in a gas phase. More specifically, the treatment may be performed using an acid such as hydrogen fluoride, hydrofluoric acid, ammonium fluoride, calcium fluoride, sodium fluoride, or other acidic fluorine compounds. When a fluorine compound is used, the amount of fluorine may be four times the amount of silicon in silicon components contained in the porous carbon material precursor, and an aqueous solution of the fluorine compound preferably has a concentration of 10% by mass or more. Hydrofluoric acid may be used to remove silicon components (e.g., silicon dioxide) from the porous carbon material precursor. In this case, as shown in chemical formula (A) or (B), silicon dioxide is allowed to react with hydrofluoric acid and removed in the form of hexafluorosilicic acid ($H_2SiF_6$) or silicon tetrafluoride ($SiF_4$), so that a porous carbon material intermediate can be obtained. Subsequently, the porous carbon material intermediate may be washed and dried.

$$SiO_2 + 6HF \rightarrow H_2SiF_6 + 2H_2O \tag{A}$$

$$SiO_2 + 4HF \rightarrow SiF_4 + 2H_2O \tag{B}$$

The treatment may also be performed using an alkali (base) such as sodium hydroxide. When an aqueous solution of an alkali is used, the aqueous solution may have a pH of 11 or more. A sodium hydroxide aqueous solution may be used to remove silicon components (e.g., silicon dioxide) from the porous carbon material precursor. In this case, when the sodium hydroxide aqueous solution is heated, silicon dioxide is allowed to react as shown in chemical formula (C) and removed in the form of sodium silicate ($Na_2SiO_3$), so that a porous carbon material intermediate can be obtained. In the treatment, sodium hydroxide may also be allowed to react in a gas phase. In this case, when solid sodium hydroxide is heated, silicon dioxide is allowed to react as shown in chemical formula (C) and removed in the form of sodium silicate ($Na_2SiO_3$), so that a porous carbon material intermediate can be obtained. Subsequently, the porous carbon material intermediate may be washed and dried.

$$SiO_2 + 2NaOH \rightarrow Na_2SiO_3 + H_2O \tag{C}$$

The average particle size of the porous carbon material can be measured by the following method. Specifically, 0.6 g of the sample is added to 400 g of a 30% by mass sodium peroxodisulfate aqueous solution and thoroughly stirred at 24° C. Ultrasound is then applied for 3 hours to the mixture being kept at 40° C. Subsequently, a procedure that includes centrifuging the mixture, removing the liquid phase, adding water to the residue, and subjecting the mixture to ultrasonic cleaning is performed twice. Thereafter, the resulting solid phase is dispersed in water and then measured for particle size with a zeta potential-particle size measurement system ELSZ-2 manufactured by Otsuka Electronics Co., Ltd. Specifically, the particle size measurement includes applying laser light to the particles dispersed in a solution and measuring the particle size by a dynamic light scattering method in which the scattered light is observed with a photon detector. A high-concentration solution should be diluted appropriately before the measurement.

The average particle size of the porous carbon material that forms an electrode, in other words, the average particle size of the porous carbon material in the form of an electrode, can be determined by observation using a scanning electron microscope (SEM). Alternatively, the porous carbon material may be scraped off the electrode, and the resulting sample may be subjected to the following measurement method. Specifically, the sample is added into N-methyl-2-pyrrolidone (NMP) and stirred at 200° C. for 3 hours. The mixture is then dried under a nitrogen atmosphere at 300° C. for 48 hours. Subsequently, 0.6 g of the sample is added to 400 g of a 30% by mass sodium peroxodisulfate aqueous solution and thoroughly stirred at 24° C. Ultrasound is then applied for 3 hours to the mixture being kept at 40° C. If necessary, the above procedure is performed twice or more. Subsequently, a procedure that includes centrifuging the mixture, removing the liquid phase, adding water to the residue, and subjecting the mixture to ultrasonic cleaning is performed twice. Thereafter, the resulting solid phase is dispersed in water and then measured for particle size with ELSZ-2 manufactured by Otsuka Electronics Co., Ltd.

The porous carbon material of an inverse opal type or the like can be produced by, for example, a process that includes immersing a nanoscale template particle assembly in a solution of a polymerizable monomer or a solution of a polymerizable monomer-containing composition, polymerizing the polymerizable monomer while immersing the template particle assembly in the solution, then carbonizing the polymer, and then removing the template particle assembly. The template particle assembly refers to, for example, an assembly of fine particles that are arranged in a pattern corresponding to a crystal structure and have three-dimensional regularity. In other words, the fine particles are arranged in a pattern like that of atoms in a crystal. It will be understood that the template particle assembly does not only have this pattern and may have a pattern in which fine particles are randomly located. When removed, the individual fine particles leave voids, which correspond to the pores. Therefore, the template particle assembly functions as a kind of template. In the carbon material, the pores may be closed voids as long as they have three-dimensional regularity as mentioned above. To increase the surface area, however, the pores preferably include voids arranged continuously (in other words, at least some of the pores preferably communicate with one another). The arrangement of the pores is determined by the packing arrangement of the fine particles in the template particle assembly. Therefore, the regularity and pattern of the arrangement of the fine particles are reflected in the regularity of the arrangement of the pores, and the irregularity and pattern of the arrangement of the fine particles are also reflected in the irregularity of the arrangement of the pores. When the pores have different sizes, the resulting pattern of the arrangement of the pores can have more complicated regularity.

Specifically, the porous carbon material of an inverse opal type or the like can be produced by a porous carbon material-producing method including the steps of: (a) immersing a nanoscale template particle assembly (an assembly of fine particles, such as inorganic particles, inorganic material particles, or inorganic compound particles, for serving as a template) in a solution of a polymerizable monomer or a solution of a polymerizable monomer-containing composition, so that a mixed composition is obtained; (b) polymerizing the polymerizable monomer in the mixed composition to forma composite of a polymer material and the template particle assembly (hereinafter, also referred to as the "template particle composite"); (c) carbonizing the polymer material in the template particle composite under an inert gas atmosphere at a temperature of 500° C. to 3,000° C.; and (d) immersing the template particle composite having undergone the carbonization of the polymer material (hereinafter, also referred to as the "carbonized template particle composite") in a liquid capable of dissolving the template particle assembly so that the template particle assembly is dissolved and removed and a porous carbon material including the carbonized polymer material is obtained. The rate of temperature rise up to the carbonization temperature may be in any range where the template particle assembly is not collapsed by localized heating. The porous carbon material obtained using the template particle assembly has pores that are arranged to macroscopically have three-dimensional regularity and continuity as mentioned above.

The shape of the fine particles used to form the template particle assembly is preferably truly spherical or substantially spherical. The fine particles used to form the template particle assembly preferably include inorganic compound particles soluble in, for example, a solution of a fluorine compound such as hydrofluoric acid, an alkaline solution, or an acidic solution. Examples of the inorganic compound include alkaline earth metal carbonates such as calcium carbonate, barium carbonate, and magnesium carbonate; alkaline earth metal silicates such as calcium silicate, barium silicate, and magnesium silicate; alkaline earth metal phosphates such as calcium phosphate, barium phosphate, and magnesium phosphate; metal oxides such as silica, titanium oxide, iron oxide, cobalt oxide, zinc oxide, nickel oxide, manganese oxide, and aluminum oxide; metal hydroxides such as iron hydroxide, nickel hydroxide, aluminum hydroxide, calcium hydroxide, and chromium hydroxide; metal silicates such as zinc silicate and aluminum silicate; and metal carbonates such as zinc carbonate and basic copper carbonate. The inorganic compound may also be a natural product such as shirasu balloon or pearlite. Alternatively, the fine particles used to form the template particle assembly may be made of an alkaline earth metal oxide (such as magnesium oxide or calcium oxide) or an organic acid metal salt (such as magnesium citrate, magnesium oxalate, calcium citrate, or calcium oxalate). In this case, the template particle assembly can be removed using a common inorganic acid such as hydrochloric acid, sulfuric acid, nitric acid, citric acid, acetic acid, or formic acid.

Any polymer that can be converted into a carbon material by carbonization may be used as a starting material for the porous carbon material (the starting material may be a solution of a polymerizable monomer or a composition containing a polymerizable monomer, specifically, a polymer capable of being converted into the porous carbon material). Specifically, the starting material may be a furfuryl alcohol resin, a phenol-aldehyde resin, a styrene-divinylbenzene copolymer, a furfuryl alcohol-phenol resin, or a polyimide resin. The starting material to be used is more preferably such that when the carbonization temperature is appropriately selected, it can be converted into glassy (amorphous) non-graphitizable carbon, graphitizable carbon, or graphite (graphitized carbon) as the porous carbon material.

The step (a) includes immersing the template particle assembly in a solution of a polymerizable monomer or a solution of a polymerizable monomer-containing composition. In the step (a), the concentration of the polymerizable monomer may be 0.1% by mass to 99.9% by mass, and if necessary, 0.001% by mass to 50% by mass of a crosslinking agent may be added to the solution. The reaction conditions such as the concentration of an initiator and the polymerization method may be selected as appropriate for the polymerizable monomer. For example, the polymerizable monomer, a catalyst, a polymerization initiator, a crosslinking agent, and other materials may be dissolved in an organic solvent purged with nitrogen, and the resulting solution may be mixed with the template particle assembly. In the step (b) for obtaining the template particle composite, polymerization may be performed by heating at a suitable temperature or by photo-irradiation. The polymer material can be obtained by radical polymerization, acid-assisted polycondensation, or any other known solution, bulk, emulsion, or reverse-phase suspension polymerization, for example, at a polymerization temperature of 0 to 100° C. for a polymerization time of 10 minutes to 48 hours.

In the step (a), the template particle assembly is formed from fine particles. The method for forming the template particle assembly may be (A) a method that includes adding a fine particles-containing solution (hereinafter referred to as a "template solution") dropwise onto a substrate and then removing the solvent from the dropped template solution by evaporation. The solvent may be evaporated at room temperature. Preferably, the solvent is evaporated by heating at a temperature equal to or higher than the boiling point of the solvent used. After the template solution is added dropwise onto the substrate, the substrate may be heated so that the solvent can be removed by evaporation. Alternatively, the template solution may be added dropwise onto a pre-heated substrate so that the solvent can be removed by evaporation. The substrate may be rotated during or after the dropwise addition of the template solution. The thickness and area of the resulting mixed composition can be controlled by repeating the process including the dropwise addition of the template solution and the removal of the solvent by evaporation, by controlling the concentration of the template solution, by controlling the amount of the template solution added dropwise, or by performing a combination of these processes as needed. Particularly, this method can easily increase the area while maintaining three-dimensional regularity. Specifically, the template solution used can have a solid concentration of 10% by mass or more. Therefore, a mixed composition with a considerable thickness can be formed on the substrate by adding the template solution dropwise only once, and the thickness of the mixed composition can be controlled by repeating the dropwise addition and the removal by evaporation (drying). For example, a monodisperse template solution may also be used, so that the resulting template particle assembly can have a single crystal structure.

Alternatively, the method for forming the template particle assembly may be (B) a method that includes subjecting the template solution to suction filtration to remove the solvent and to deposit a mixed composition. Specifically, the solvent is aspirated and removed from the template solution by suction under reduced pressure using a suction funnel, so that the mixed composition can be deposited on a paper or cloth filter on the suction funnel. Also in this method, for example, a monodisperse template solution may be used, so that the resulting template particle assembly can have a single crystal structure. The concentration of the template solution to be subjected to the suction filtration may be appropriately selected based on the volume of the mixed composition to be obtained by a single process. Alternatively, a process that includes once removing the whole amount of the solvent by suction and then adding the template solution again may be repeated so that a desired volume of the mixed composition can be obtained. This method can also increase the area and volume of the mixed composition while maintaining three-dimensional regularity. The solvent aspiration method may be, but not limited to, a method of aspirating the solvent with an aspirator, a pump, or the like. The aspiration rate is also not restricted. For example, the aspiration rate may be so set that at a reduced pressure of about 40 mmHg, the level of the template solution in the suction funnel can be lowered at a constant rate.

Alternatively, the method for forming the template particle assembly may be (C) a method that includes immersing a substrate in the template solution, then pulling the substrate out, and evaporating the solvent. Specifically, the lower parts of two smooth substrates opposed to each other with a distance of tens µm are immersed in a relatively dilute template solution with a solid concentration of 1% by mass to 5% by mass, so that the template solution is allowed to move upward between the substrates by the capillary action and the solvent is removed by evaporation, which allows the deposition of a mixed composition between the substrates. Also in this method, a mixed composition with a desired area and a desired volume can be obtained by controlling the concentration of the template solution used or by repeating the process. The substrate pulling rate is not restricted. Preferably, the substrates are pulled at a low rate because the template particle assembly is grown at the interface between the template solution and the air. Although not restricted, the solvent evaporating rate is preferably relatively low for the same reason. For example, a monodisperse template solution may be used, so that the resulting template particle assembly can have a single crystal structure.

Alternatively, the method for forming the template particle assembly may be (D) a method that includes applying an electric field to the template solution and then removing the solvent, (E) a method that includes dispersing the template solution, allowing the dispersed template solution to stand to allow the fine particles to settle out spontaneously, and then removing the solvent, or (F) a convective assembly method or the like.

Alternatively, the method for forming the porous carbon material may be a method that includes mixing a starting material for the porous carbon material and fine particles forming the template particle assembly in the state of a solution or powder by a wet or dry process, then converting the starting material for the porous carbon material into a carbon material by carbonization, and then dissolving and removing the template particle assembly.

The surface properties of the substrate used are not restricted. Preferably, the substrate used has a smooth surface.

When made of an inorganic compound, the template particle assembly can be dissolved and removed using a solution such as an acidic solution of a fluorine compound, an alkaline solution, or an acidic solution (hereinafter referred to as a "template particle remover solution" for the sake of convenience). For example, when the template particle assembly is made of silica, shirasu balloon, or a silicate, the carbonized template particle composite only needs to be immersed in a template particle remover solution including a hydrofluoric acid aqueous solution, an acidic solution of ammonium fluoride, calcium fluoride, or sodium fluoride, or an alkaline solution of sodium hydroxide or the like. The template particle remover solution should contain fluorine in an amount 4 times the amount of silicon in the carbonized template particle composite. The template particle remover solution preferably has a concentration of 10% by mass or more. The alkaline solution may have any level of pH not lower than 11. When the template particle assembly is made of a metal oxide or a metal hydroxide, the carbonized template particle composite only needs to be immersed in a template particle remover solution including an acidic solution of hydrochloric acid or the like. The acidic solution may have any level of pH not higher than 3. In some cases, the template particle assembly may be dissolved and removed before the carbonization of the polymer material.

The air-metal secondary battery of the present disclosure may be built into, for example, electronic devices. Basically, the electronic devices may be of any type and include both portable and stationary devices. Specifically, the electronic devices include cellular phones, mobile devices, robots, personal computers, game machines, camera-integrated video tape recorders (VTRs), on-vehicle devices, various home electric appliances, industrial products, and the like.

Example 1

Example 1 relates to the air-metal secondary battery of the present disclosure. The air-metal secondary battery of Example 1 has an electrode including a porous carbon material, in which the porous carbon material has a specific surface area of 280 $m^2/g$ or more, preferably 700 $m^2/g$ or more, more preferably 1,500 $m^2/g$ or more, as determined by the nitrogen BET method. The air-metal secondary battery of Example 1 also has an average charging voltage of 4.4 V or less, preferably 4.3 V or less, more preferably 4.1 V or less. In the air-metal secondary battery of Example 1, the electrode forms a cathode, and the air-metal secondary battery includes an air-lithium secondary battery. Specifically, its anode contains lithium (Li) as an anode active material. The porous carbon material used in Example 1 is an inverse opal-type porous carbon material or a porous carbon material produced by a template method, namely, a porous carbon material of an inverse opal type or the like.

Specifically, the porous carbon material in Example 1 has three-dimensional regularity. More specifically, the porous carbon material in Example 1 has pores arranged three-dimensionally regularly and arranged in a pattern forming a crystal structure macroscopically and has a pore distribution with a maximum in the range of 2 nm to 300 nm.

In Example 1, the porous carbon material of an inverse opal type or the like was produced by the following method. Specifically, a template particle assembly was formed using fine particles as follows. Monodisperse spherical silica fine particles (trade name: SEAHOSTAR KE) manufactured by NIPPON SHOKUBAI CO., LTD. or spherical silica fine particles (trade name: SNOWTEX) manufactured by Nissan Chemical Industries, Ltd. were used to form a monodisperse colloidal silica aqueous suspension solution with a solid concentration of 3% by mass to 40% by mass. The fine particles used to form a template particle assembly has a particle size of 5 nm to 500 nm (see Table 1). The monodisperse colloidal silica aqueous suspension solution was then dried up at 100° C. for 24 hours, so that a template particle assembly of a silica block was formed on the bottom of the vessel.

Alternatively, a template particle assembly of silica can be obtained using, for example, the following method. Specifically, the monodisperse colloidal silica aqueous suspension solution is fed onto a filter cloth placed on an SPC filter holder 30 mm in diameter (manufactured by SIBATA SCIENTIFIC TECHNOLOGY LTD.) and subjected to suction filtration under reduced pressure (e.g., at a reduced pressure of about 40 mmHg) using an aspirator. As a result, a template particle assembly of a colloidal silica layer is formed on the filter cloth. The filter cloth may be a polycarbonate membrane filter manufactured by Whatman. Subsequently, the template particle assembly is separated from the filter cloth and then sintered at 1,000° C. for 2 hours in the air to form a template particle assembly thin film (a silica template particle assembly in the form of a thin film).

Subsequently, the template particle assembly was immersed in a solution of a polymerizable monomer-containing composition to form a mixed composition. Specifically, the template particle assembly in the form of a thin film was placed on a polytetrafluoroethylene sheet, and a solution of a mixture of 10.0 g of furfuryl alcohol and 0.05 g of oxalic acid hexahydrate (all manufactured by Wako Pure Chemical Industries, Ltd.) was added dropwise onto the template particle assembly. An unnecessary overflow of the solution was then gently wiped from the template particle assembly. The template particle assembly was then placed in a desiccator. The desiccator was then vacuumed several times so that the template particle assembly was surely impregnated with the solution. In this way, a mixed composition was successfully obtained.

Subsequently, the polymerizable monomer in the mixed composition was polymerized to form a template particle composite, which was a composite of a polymer material (polymer resin) and the template particle assembly. Specifically, the monomer was polymerized at 80° C. for 48 hours in the air. The resulting polymer material (polymer resin) can be finally converted into a non-graphitizable carbon material or a graphitizable carbon material.

Subsequently, the polymer material in the template particle composite was carbonized under an inert gas atmosphere at a temperature of 500° C. to 3,000° C. Specifically, the resulting template particle composite was heated under an argon or nitrogen atmosphere at 200° C. for 1 hour in a tubular furnace so that water was removed and the polymer material was cured again. Subsequently, the template particle composite was heated at a rate of 5° C./minute under an argon atmosphere, carbonized at a constant temperature of 800° C. to 1,400° C. for 1 hour, and then cooled, so that a silica-carbon composite was obtained as a carbonized template particle composite.

Subsequently, the carbonized template particle composite was immersed in a liquid capable of dissolving the template particle assembly, so that the template particle assembly was dissolved and removed and a porous carbon material made of the carbonized polymer material was obtained. Specifically, the carbonized template particle composite was immersed in a 46% hydrofluoric acid aqueous solution at room temperature for 24 hours so that the template particle assembly was dissolved. The residue was then repeatedly washed with pure water and ethyl alcohol to neutrality to yield a porous carbon material of an inverse opal type or the like. If higher conductivity is necessary, the porous carbon material may be baked under a nitrogen atmosphere at a high temperature (1,400° C. to 3,000° C.).

Alternatively, the porous carbon material of an inverse opal type or the like can be produced using the method described in Japanese Patent No. 4945884.

The porous carbon material obtained as described above was observed with a scanning electron microscope (SEM). As a result, the porous carbon material was found to have three-dimensional regularity and specifically have pores arranged three-dimensionally regularly and arranged in a pattern forming a crystal structure macroscopically. The pores were also found to be arranged in a face-centered cubic structure macroscopically. In addition, the pores were found to be arranged in a pattern corresponding to a (111)-oriented face-centered cubic structure macroscopically. The wavelength of light reflected from the porous carbon material was also measured when white light was applied at a grazing incidence angle of 0° to the porous carbon material placed in a dark place. As a result, the resulting reflection spectrum showed single-peak absorption at a specific wavelength corresponding to the pore size. This showed that the pores inside the porous carbon material were also three-dimensionally regularly arranged. In addition, the pores were continuously arranged and had a spherical or substantially spherical shape.

The resulting porous carbon material of an inverse opal type or the like was subjected to classification using a sieve with a mesh size of 75 μm, and a 75 μm pass product was obtained. The product was named the porous carbon material of Example 1. Table 1 shows the size (nm) of the fine particles used to form the template particle assembly in each of Example 1, Comparative Example 1, and Example 2. Table 1 also shows the BET specific surface area (in units of $m^2/g$, represented by "Specific surface area" in Table 1) of the porous carbon material of each of Example 1, Comparative Example 1, and Example 2. Table 1 also shows the pore size (in units of nm) at which the pore distribution exhibits a maximum (represented by "Maximum of pore distribution" in Table 1) and shows the average charging voltage (in units of V). In Example 1B, the porous carbon material of Example 1A was subjected to an activation treatment using water vapor (conditions: 900° C., 3 hours). In Comparative Example 1B, spherical electrically-conductive carbon black (CB, Super P manufactured by TIMCAL Graphite & Carbon) was used. In Example 2, a plant-derived porous carbon material (biocarbon, BC) was used as described below. Table 2 shows the total pore volume determined by BET method (in units of $cm^3/g$, represented by "Total pore volume" in Table 2), the pore volume determined by BJH method (in units of $cm^3/g$, represented by "BJH method" in Table 2), and the pore volume determined by MP method (in units of cm³/g, represented by "MP method" in Table 2). Note that in Table 1, "---" means "not detectable by nitrogen adsorption method."

TABLE 1

|  | Fine particle size | Specific surface area | Maximum of pore distribution | Average charging voltage |
|---|---|---|---|---|
| Example 1A | 5 | 1588 | 3.8 | 4.05 |
| Example 1B | 5 | 2390 | 3.3 | 3.94 |
| Example 1C | 30 | 1378 | 18 | 4.15 |
| Example 1D | 50 | 776 | 52 | 4.28 |
| Example 1E | 100 | 536 | 108 | 4.29 |
| Example 1F | 280 | 310 | — | 4.39 |
| Comparative Example 1A | 500 | 274 | — | 4.48 |
| Comparative Example 1B |  | 55 | — | 4.48 |
| Example 2 |  | 1574 | Not detectable | 4.32 |

TABLE 2

|  | Total pore volume | BJH method | MP method |
|---|---|---|---|
| Example 1A | 1.70 | 1.49 | 0.92 |
| Example 1B | 2.09 | 1.68 | 1.54 |
| Example 1C | 4.11 | 3.96 | <0.1 |
| Example 1D | 4.53 | 4.46 | <0.1 |
| Example 1E | 4.23 | 4.15 | <0.1 |
| Example 1F | 1.36 | 1.32 | <0.1 |
| Comparative Example 1A | 1.10 | 1.02 | <0.1 |
| Comparative Example 1B | 0.22 | 0.27 | <0.1 |
| Example 2 | 1.23 | 0.79 | 0.62 |

In each of Example 1 and Comparative Example 1, an electrode was prepared by the following process. Specifically, 0.292 g of the porous carbon material or the like of each of Examples 1A, 1B, 1C, 1D, 1E, and 1F and Comparative Examples 1A and 1B shown in Table 1, 0.052 g of polyvinylidene fluoride (PVDF), and 1 ml of N-methyl-2-pyrrolidone (NMP) were mixed and kneaded. In this case, PVDF functions as a binder. The resulting paste was applied to a gas diffusion layer (substrate) made of carbon paper. Subsequently, the paste was sufficiently dried at 120° C. and then dried under vacuum at 100° C. overnight. A 15 mm diameter piece was then punched out of the product to give a cathode for an air-lithium secondary battery.

Subsequently, the resulting cathode was used to form a 2016 type, coin-shaped, air-lithium secondary battery. Specifically, the cathode, an electrolyte, and a 0.8-mm-thick lithium foil anode were stacked to form a 2016 type, coin-shaped, air-lithium secondary battery. Specifically, the electrolyte used was 40 it of a mixture of lithium bistrifluoromethanesulfonylimide (LiTSFI, $(CF_3SO_2)_2NLi$) and tetraethylene glycol dimethyl ether (TEGDME) (¼ in molar ratio). A 200-μm-thick glass fiber separator was also used.

The air-lithium secondary battery was subjected to a charging-discharging test under the following conditions. The discharging conditions were a cut-off voltage of 2.0 V and a discharging current of 100 (mA/1 g of cathode). The charging conditions were a cut-off voltage of 4.7 V and a charging current of 100 (mA/1 g of cathode). The same conditions were also used in Example 2.

Figure 2:
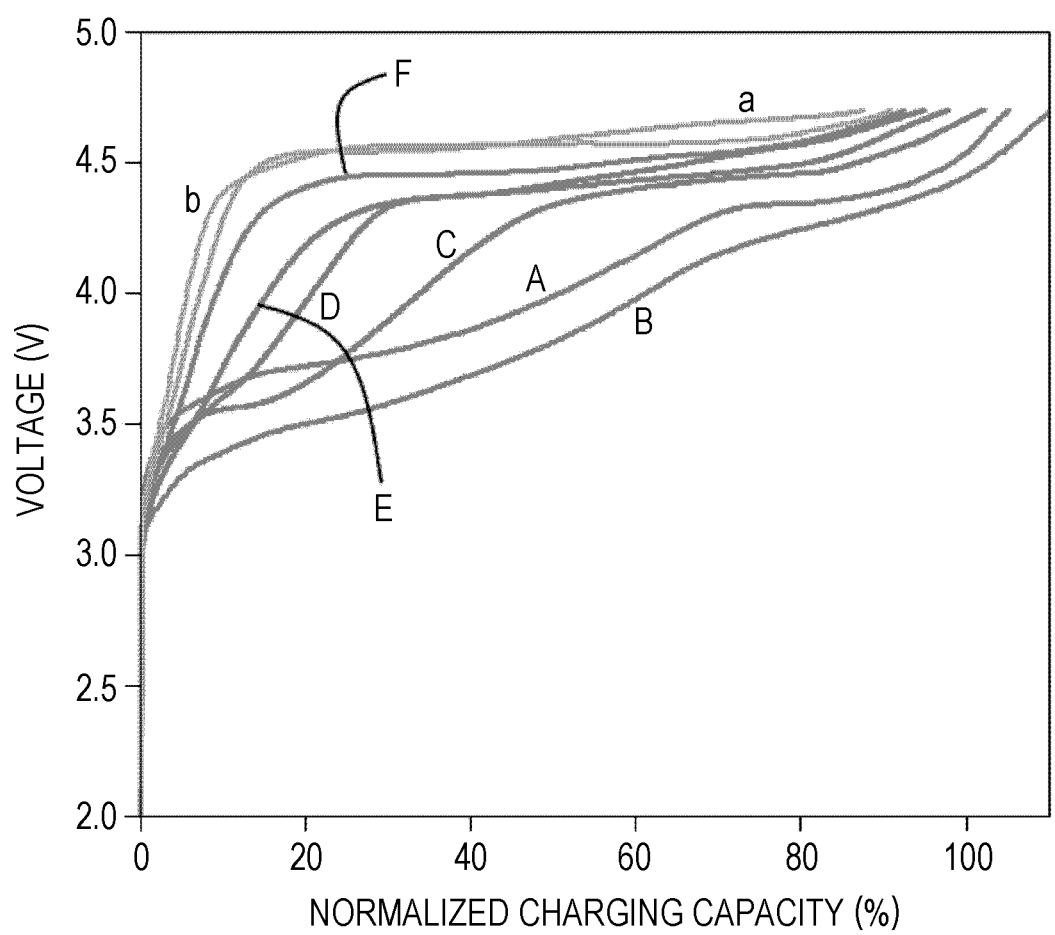
FIG. 2 is a graph showing the normalized data of the charging capacity measurement results shown in FIG. 1 with respect to air-metal secondary batteries according to Example 1.
Figure 3A:
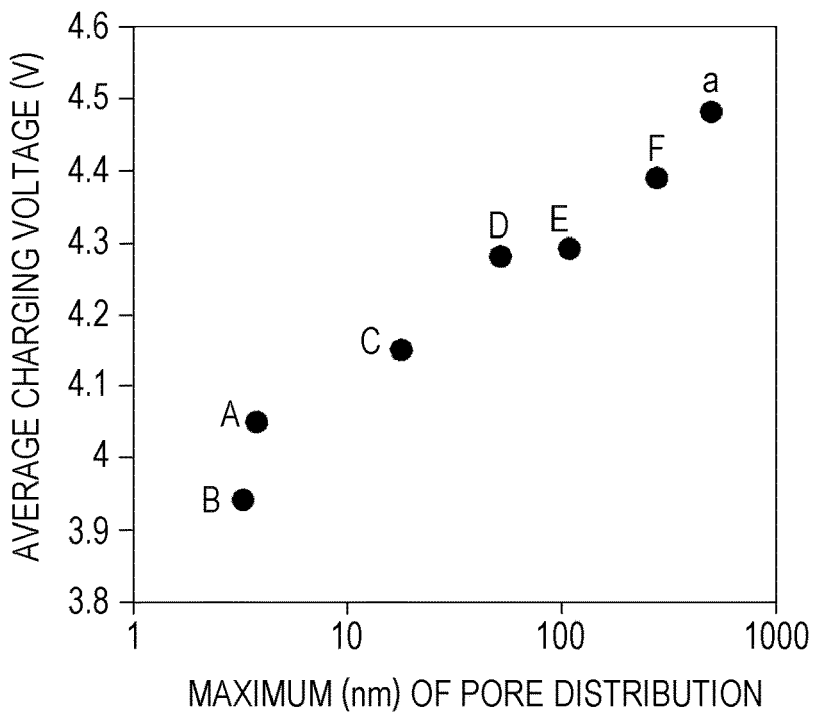
FIG. 3A is a graph showing the relationship between the maximum of the pore distribution and the average charging voltage, which is obtained from the results of measurement of the charging capacity of air-metal secondary batteries according to Example 1.
Figure 3B:
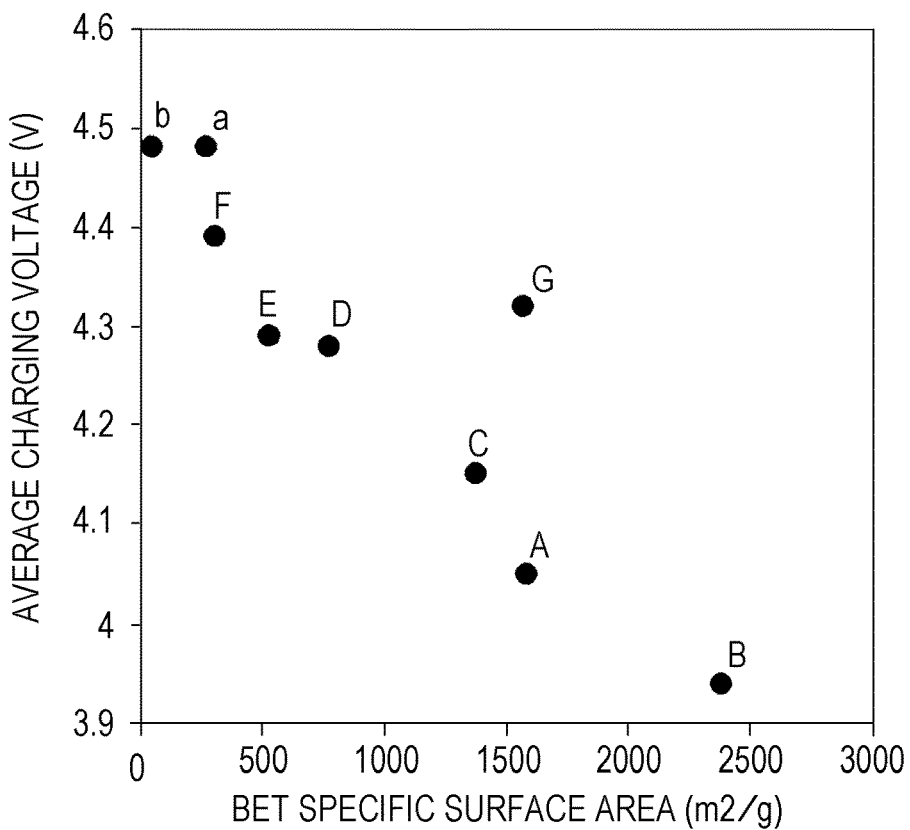
FIG. 3B is a graph showing the relationship between the BET specific surface area and the average charging voltage, which is obtained from the results of measurement of the charging capacity of air-metal secondary batteries according to Example 1.

FIG. 1 shows the first cycle (initial) charging-discharging curves of the resulting air-lithium secondary batteries. In FIG. 1, the horizontal axis represents the charging-discharging capacity (the value per 1 g of the cathode, in units of mA·hour), and the vertical axis represents the voltage (in units of V). FIG. 2 shows the normalized data of the charging-discharging test results in FIG. 1 (a graph that is obtained by rewriting the graph of the charging capacity measurement results in FIG. 1 when the charging capacity is normalized to 100%). FIG. 3A is a graph showing the relationship between the maximum of the pore distribution and the average charging voltage, which was obtained from the charging capacity measurement results. FIG. 3B is a graph showing the relationship between the BET specific surface area and the average charging voltage, which was obtained from the charging capacity measurement results. In FIG. 3A, the horizontal axis represents the maximum of the pore distribution (in units of nm). In FIG. 3B, the horizontal axis represents the BET specific surface area (in units of m²/g). In FIGS. 3A and 3B, the vertical axis represents the average charging voltage. In this case, the average charging voltage is the value obtained by integrating the voltage of the normalized charging curve in FIG. 2 from a charging capacity of 0% to a charging capacity of 100% and then averaging the integrated value. In FIGS. 1, 2, 3A, 3B, and 7, the letters "A", "B", "C", "D", "E", "F", "G", "a", and "b" represents the data on Examples 1A, 1B, 1C, 1D, 1E, 1F, and 2 and Comparative Examples 1A and 1B, respectively. As regards the charging-discharging curves in FIG. 1, the curves shown on the upper side are charging curves, and the curves on the lower side are discharging curves.

FIG. 3A shows that the average charging voltage decreases as the maximum of the pore distribution decreases. This may be because as the pore size decreases, the size of $Li_2O_2$ particles precipitated on the surface of the porous carbon material is kept smaller, so that it becomes easy to decompose the $Li_2O_2$ precipitated during the charging. FIG. 3B shows that the average charging voltage decreases as the BET specific surface area increases. This may be because as the BET specific surface area increases, the current per effective electrode area is kept lower, so that the overvoltage is suppressed.

FIG. 3B shows that it is possible to obtain an air-metal secondary battery that contains a porous carbon material having a specific surface area of 280 m²/g or more, preferably 700 m²/g or more, more preferably 1,500 m²/g or more, as determined by the nitrogen BET method, and has an average charging voltage of 4.4 V or less, preferably 4.3 V or less, more preferably 4.1 V or less. The graph of FIG. 3B shows that the average charging voltage $V_{ch-ave}$ is preferably in the range of $a \cdot S_{BET}+b$ to $c \cdot S_{BET}+d$ ($a \cdot S_{BET}+b \leq V_{ch-ave} \leq c \cdot S_{BET}+d$), wherein $S_{BET}$ is the specific surface area of the porous carbon material as measured by the nitrogen BET method, $a=-2 \times 10^{-4}$ (V·g·m⁻²), $c=-2 \times 10^{-4}$ (V·g·m⁻²), $b=4.0$ (V), and $d=5.0$ (V).

Figure 5A:
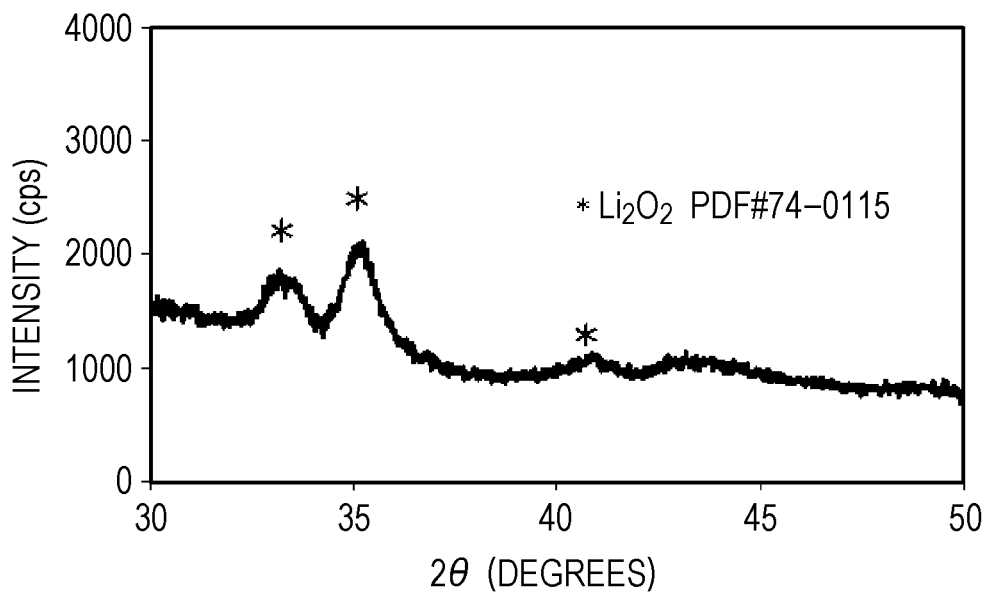
FIGS. 5A and 5B are graphs showing the results of X-ray diffraction analysis of the cathodes of air-metal secondary batteries according to Example 1 and Comparative Example 1, respectively, after discharging.
Figure 5B:
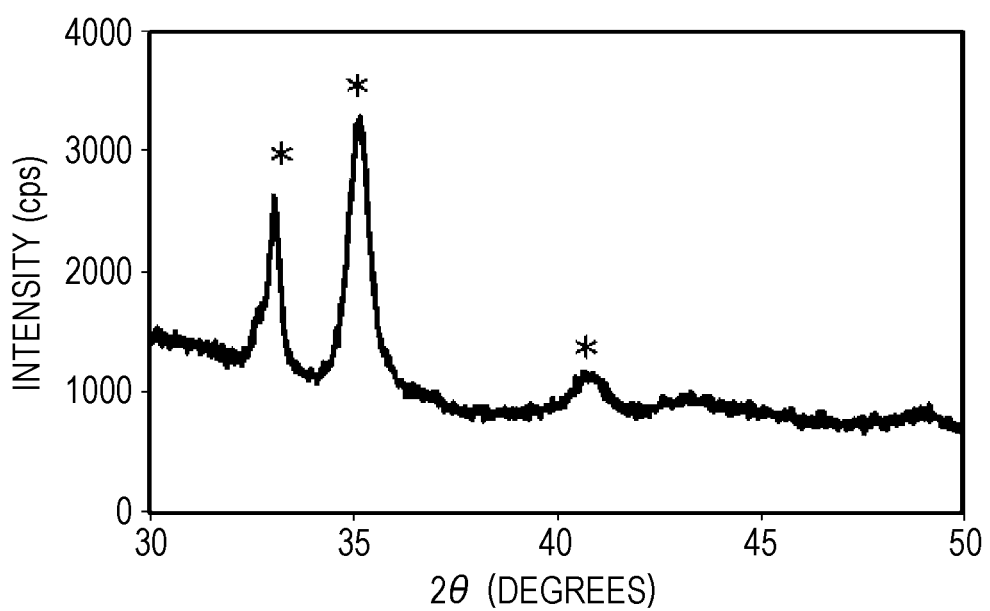
Figure 6:
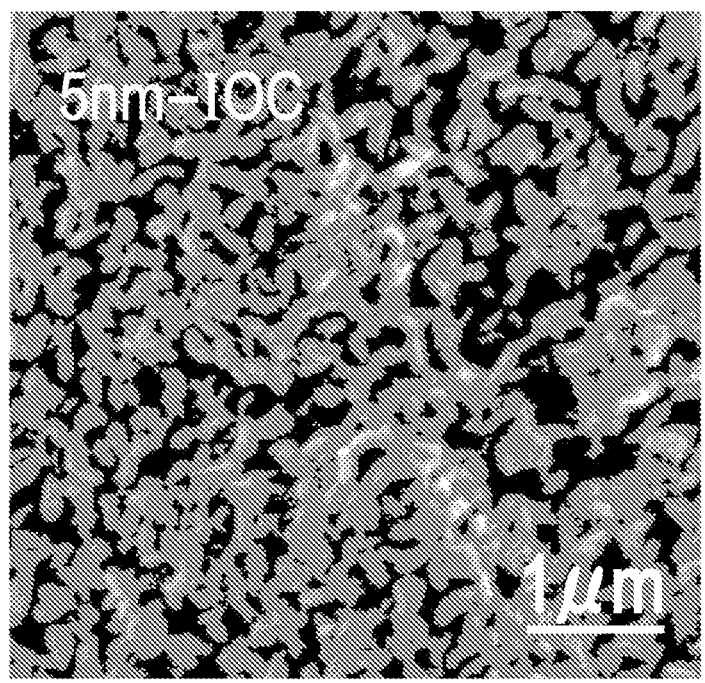
FIG. 6 is an electron micrograph showing the cathode of an air-metal secondary battery according to Example 1 after discharging.
Figure 6:
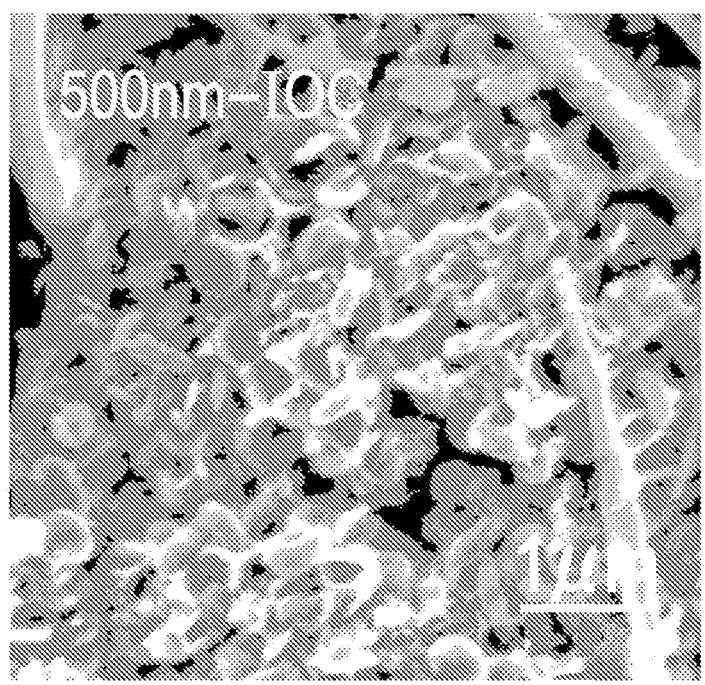
Figure 7:
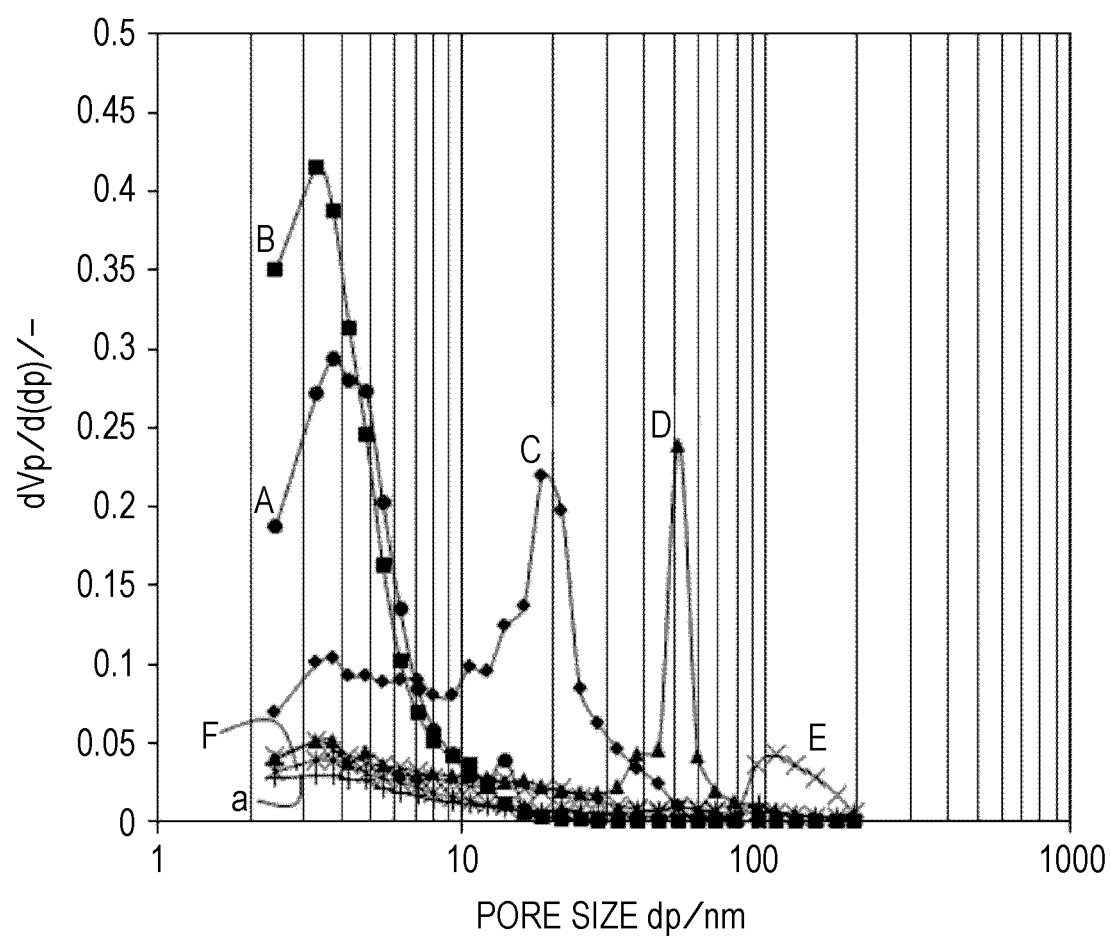
FIG. 7 is a graph showing the results of measurement of the pore distribution of the porous carbon material of each of Examples 1A, 1B, 1C, 1D, 1E, and 1F and Comparative Example 1A.

FIGS. 5A and 5B show the results of X-ray diffraction analysis of the cathodes of the air-metal secondary batteries of Example 1 and Comparative Example 1 after the discharging. FIG. 5A shows the results on the air-metal secondary battery having the porous carbon material of Example 1A, and FIG. 5B shows the results on the air-metal secondary battery having the porous carbon material of Comparative Example 1A. FIGS. 5A and 5B show that after the discharging, the cathode of the air-metal secondary battery contains $Li_2O_2$. FIG. 6 shows an electron micrograph of the cathode of the air-metal secondary battery of each of Example 1 and Comparative Example 1 after the discharging. The upper part of FIG. 6 is an electron micrograph in the air-metal secondary battery including the porous carbon material of Example 1A, and the lower part of FIG. 6 is an electron micrograph in the air-metal secondary battery including the porous carbon material of Comparative Example 1A. FIG. 7 shows the results of measurement of the pore distribution of the porous carbon material of each of Examples 1A, 1B, 1C, 1D, 1E, and 1F and Comparative Example 1A.

These results show that the $Li_2O_2$ particles as a discharge product can be controlled to be smaller when the porous carbon material used has smaller pores and a larger BET specific surface area and that the average charging voltage can be reduced by using a porous carbon material having fine pores and a large BET specific surface area. The air-metal secondary battery of Example 1 has an electrode including a porous carbon material having the specified specific surface area as determined by the nitrogen BET method. The air-metal secondary battery of Example 1 also has the specified average charging voltage. These features make it possible to provide an air-metal secondary battery with a lower average charging voltage.

Example 2

Example 2 is a modification of Example 1. An inverse opal-type porous carbon material is used in Example 1. On the other hand, a plant-derived porous carbon material having a pore volume of 0.1 $cm^3$/g or more as determined by BJH method and MP method is used in Example 2. A plant-derived material having a silicon content of 5% by mass or more is used as a raw material.

In Example 2, rice hulls were used as a plant-derived raw material with a silicon (Si) content of 5% by mass or more. The rice hulls were carbonized (baked) under a nitrogen atmosphere at 800° C. to form a porous carbon material precursor. The resulting porous carbon material precursor was then subjected to an acid treatment by being immersed in an aqueous solution of 48% by volume hydrofluoric acid, so that silicon components were removed from the carbonized plant-derived material. Subsequently, the product was washed with water and ethyl alcohol to pH 7 and then dried to give a porous carbon material intermediate. The porous carbon material intermediate was then heated to 900° C. under a nitrogen atmosphere and subjected to an activation treatment with water vapor (at a rate of 5 L/minute) for 3 hours. The activated porous carbon material was then mixed with ethyl alcohol. The material was then ground with a jet mill to give a 4 μm pass product. The 4 μm pass product was then heat-treated at a temperature higher than the carbonization temperature (specifically 800° C.). Specifically, in the heat treatment, the 4 μm pass product was heated to 1,400° C. at a rate of 5° C./minute under a nitrogen atmosphere and then kept at 1,400° C. for 1 hour. In this way, the plant-derived porous carbon material of Example 2 was obtained. Table 1 shows the BET specific surface area and other values of the plant-derived porous carbon material of Example 2.

Figure 4:
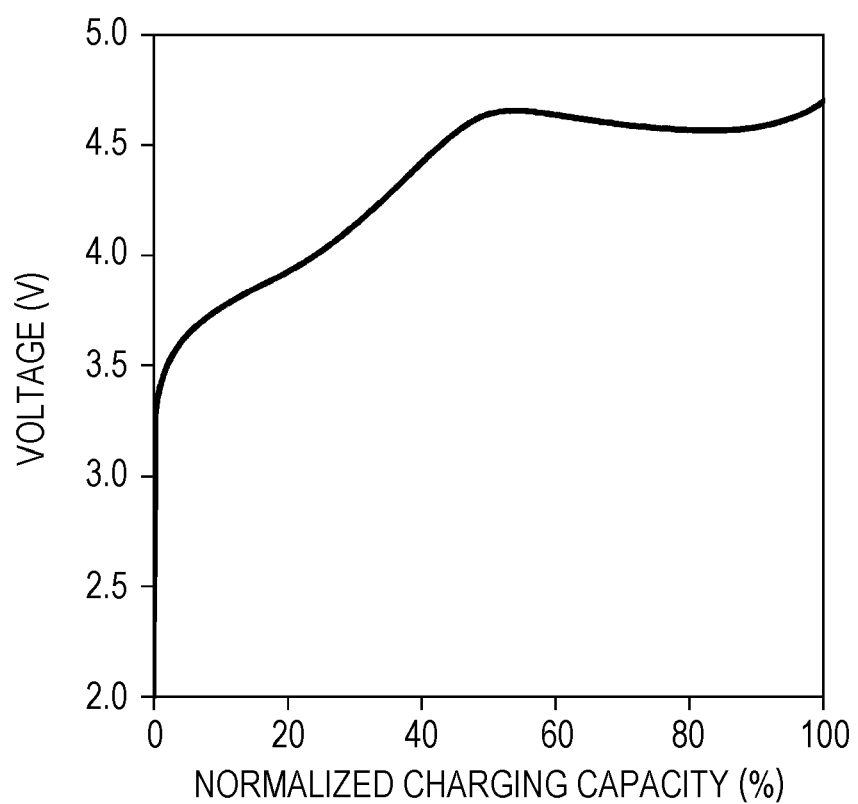
FIG. 4 is a graph showing the normalized data of the results of measurement of the charging capacity of an air-metal secondary battery according to Example 2.

A cathode for an air-lithium secondary battery and an air-lithium secondary battery were prepared using the same process as in Example 1. FIG. 4 shows the normalized data of the results of the first cycle (initial) charging test of the resulting air-lithium secondary battery (a graph of the charging capacity measurement results obtained when the charging capacity is normalized to 100%). Also in FIG. 3B, the letter "G" indicates the relationship between the BET specific surface area and the average charging voltage, obtained from the charging capacity measurement results.

The charging capacity characteristics of the air-lithium secondary battery produced with the plant-derived porous carbon material of Example 2 were substantially the same as those of the battery produced with the inverse opal-type porous carbon material of Example 1D with a fine particle size of 50 nm.

Although the present disclosure has been described with reference to preferred examples, it will be understood that these examples are not intended to limit the present disclosure and can be modified in various ways. The raw materials, production conditions, and other conditions for the porous carbon materials in the examples are only by way of example and may be changed as needed. Although rice hulls are used as a raw material for the plant-derived porous carbon material in the example described above, other plants may also be used as raw materials. Such other plants include straws, reeds, stems of Wakame seaweed, terrestrial vascular plants, ferns, bryophytes, algae, and marine algae. These plants may be used alone or in combination of two or more. Specifically, for example, straws of paddy (e.g., Isehikari produced in Kagoshima prefecture in Japan) may be used as a plant-derived raw material for the porous carbon material. When a plant-derived porous carbon material is produced, the straws as a raw material may be carbonized into a carbonaceous material (porous carbon material precursor), which may be then treated with an acid so that a porous carbon material intermediate can be obtained. Alternatively, Poaceae family reeds may be used as a plant-derived raw material for the porous carbon material, and the Poaceae family reeds as a raw material may be carbonized into a carbonaceous material (porous carbon material precursor), which may be then treated with an acid so that a porous carbon material intermediate can be obtained. The same results can also be obtained using a porous carbon material obtained through a treatment with an alkali (base) such as a sodium hydroxide aqueous solution instead of the hydrofluoric acid aqueous solution. The plant-derived porous carbon material can be produced by the same process as in Example 2.

Alternatively, stems of Wakame seaweed (harvested in Sanriku, Iwate prefecture in Japan) may be used as a plant-derived raw material for the porous carbon material. The stems of Wakame seaweed may be carbonized into a carbonaceous material (porous carbon material precursor), which may be then treated with an acid, so that a porous carbon material intermediate can be obtained. Specifically, for example, the stems of Wakame seaweed are first subjected to a pre-carbonization treatment by being heated at a temperature of about 500° C. Before the heating, the stems of Wakame seaweed as a raw material may be treated with an alcohol. Specifically, the treatment method may be a method of immersing the stems in ethyl alcohol or the like. This treatment reduces the water content of the raw material and allows the elution of non-carbon elements and mineral components, which would otherwise be left in the finally resulting plant-derived porous carbon material. When this alcohol treatment is performed, gas generation can also be suppressed during the carbonization. More specifically, the stems of Wakame seaweed are immersed in ethyl alcohol for 48 hours. An ultrasonic treatment is preferably performed on the material in ethyl alcohol. The stems of Wakame seaweed are then carbonized by being heated at 500° C. for 5 hours in a nitrogen stream, so that a carbonized material is obtained. When such a pre-carbonization treatment is performed, tar components can be reduced or removed, which would otherwise be produced during the subsequent carbonization. Subsequently, 10 g of the carbonized material is placed in an alumina crucible and heated to 1,000° C. at a rate of 5° C./minute in a nitrogen stream (10 L/minute). The material is then converted into a carbonaceous material (porous carbon material precursor) by carbonization at 1,000° C. for 5 hours, which is then cooled to room temperature. The nitrogen gas is kept flowing during the carbonization and cooling. Subsequently, the porous carbon material precursor is subjected to an acid treatment by being immersed in an aqueous solution of 46% by volume hydrofluoric acid overnight. The product is washed with water and ethyl alcohol to pH 7 and then dried to give a porous carbon material intermediate.

The present disclosure may also have the following features.

[A01] <<Air-Metal Secondary Battery>>

An air-metal secondary battery including an electrode including a porous carbon material, wherein the porous carbon material has a specific surface area of 280 m²/g or more as determined by a nitrogen BET method, the air-metal secondary battery having an average charging voltage of 4.4 V or less.

[A02] The air-metal secondary battery according to [A01], which has an average charging voltage of 4.3 V or less, wherein the porous carbon material has a specific surface area of 700 m²/g or more as determined by a nitrogen BET method.

[A03] The air-metal secondary battery according to [A01] or [A02], which has an average charging voltage $V_{ch-ave}$ in the range of $a \cdot S_{BET}+b$ to $c \cdot S_{BET}+d$ ($a \cdot S_{BET}+b \leq V_{ch-ave} \leq c \cdot S_{BET}+d$), wherein $S_{BET}$ is the specific surface area of the porous carbon material as determined by a nitrogen BET method, $a=-2\times10^{-4}$ (V·g·m²), $c=-2\times10^{-4}$ (V·g·m²), $b=4.0$ (V), and $d=5.0$ (V).

[A04] The air-metal secondary battery according to any one of [A01] to [A03], wherein the porous carbon material is derived from a plant and has a pore volume of 0.1 cm³/g or more as determined by a BJH method and an MP method.

[A05] The air-metal secondary battery according to any one of [A01] to [A04], wherein the porous carbon material is made from a plant-derived material with a silicon content of 5% by mass or more.

[A06] The air-metal secondary battery according to any one of [A01] to [A03], wherein the porous carbon material includes an inverse opal-type porous carbon material or a porous carbon material produced by a template method.

[A07] The air-metal secondary battery according to [A06], wherein the porous carbon material has three-dimensional regularity, and the porous carbon material has pores arranged in a pattern forming a crystal structure macroscopically and has a pore distribution with a maximum in the range of 2 nm to 300 nm.

[A08] The air-metal secondary battery according to [A07], wherein the pores are macroscopically arranged in a face-centered cubic structure.

[A09] The air-metal secondary battery according to [A08], wherein the pores are macroscopically arranged in a pattern corresponding to a (111)-oriented face-centered cubic structure.

[A10] The air-metal secondary battery according to any one of [A06] to [A09], wherein the pores are continuously arranged.

[A11] The air-metal secondary battery according to any one of [A06] to [A10], wherein the pores have a spherical shape or a substantially spherical shape.

[A12] The air-metal secondary battery according to any one of [A06] to [A11], wherein the porous carbon material is made from a starting material with which a non-graphitizable carbon material or a graphitizable carbon material can be obtained.

[A13] The air-metal secondary battery according to any one of [A01] to [A12], wherein the electrode forms a cathode.

[A14] The air-metal secondary battery according to [A13], which includes an air-lithium secondary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An air-metal secondary battery comprising a cathode composed of a porous carbon material, wherein the porous carbon material has a specific surface area greater than 1500 m²/g as determined by a nitrogen BET method and comprises an inverse opal-type porous carbon material, the air-metal secondary battery having an average charging voltage of 4.4 V or less, wherein the air-metal secondary battery has an average charging voltage Vch-ave in arange of aSBET+b to cSBET+d, whereinaSBET+b<Vch-ave<cSBET+d, wherein SBET is the specific surface area of the porous carbon material as determined by the nitrogen BET method, wherein $a=-2\times10^{-4}$(Vgm⁻²), $c=-2\times10^{-4}$ (Vgm⁻²), $b=4.0$ (V), and $d=5.0$ (V), wherein the porous carbon material has three-dimensional regularity, and the porous carbon material has pores arranged in a pattern forming a crystal structure macroscopically and has a pore distribution with a maximum in the range of 2 nm to 18 nm, and wherein the porous carbon material is derived from a plant and has a pore volume ranging from 0.5 cm³/g to 3.96 cm³/g as determined by a BHJ method.

2. The air-metal secondary battery according to claim 1, wherein the porous carbon material is produced by a template method.

3. The air-metal secondary battery according to claim 1, wherein the pores are macroscopically arranged in a face-centered cubic structure.

4. The air-metal secondary battery according to claim 3, wherein the pores are macroscopically arranged in a pattern corresponding to a (111)-oriented face-centered cubic structure.

5. The air-metal secondary battery according to claim 2, wherein the pores are continuously arranged.

6. The air-metal secondary battery according to claim 2, wherein the pores have a spherical shape or a substantially spherical shape.

7. The air-metal secondary battery according to claim 2, wherein the porous carbon material is made from a starting material with which a non-graphitizable carbon material or a graphitizable carbon material can be obtained.

8. The air-metal secondary battery according to claim 1, which comprises an air-lithium secondary battery.

9. The air-metal secondary battery according to claim 1, which the porous carbon material has a particle size of 50 nm.

10. The air-metal secondary battery according to claim 1, wherein the porous carbon material has a total pore volume between 1 cm³/g and 5 cm³/g as determined by a BJH method.

11. The air-metal secondary battery according to claim 1, wherein the average charging voltage 4.1 V or less.

12. The air-metal secondary battery according to claim 1, wherein the average charging voltage is 4.0 V or less.

* * * * *